Figure 1:
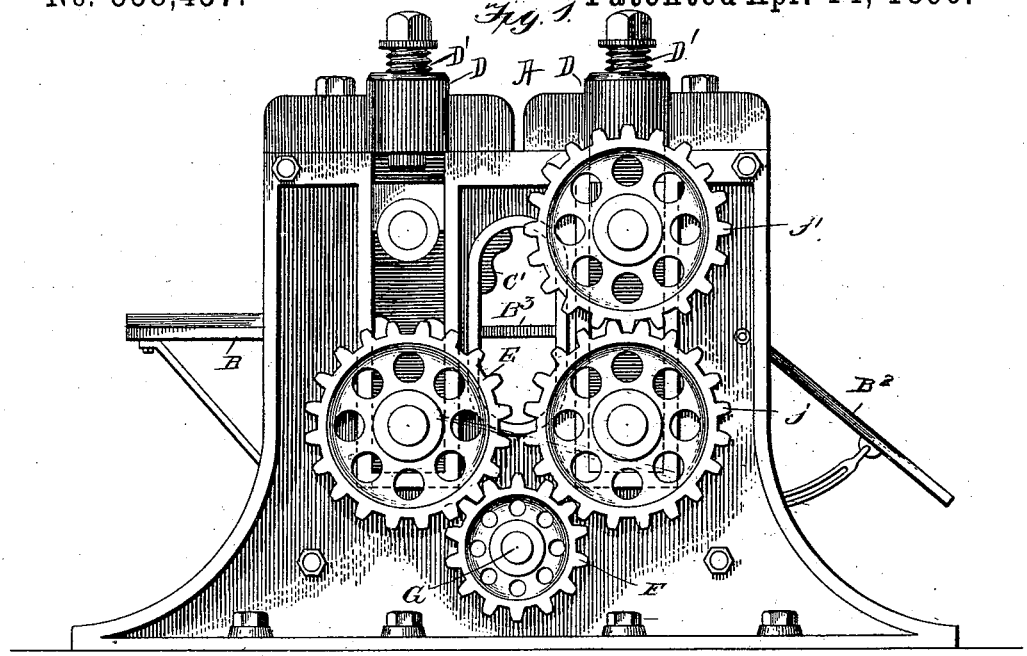

(No Model.) 2 Sheets—Sheet 1.

F. McCARTY.
APPARATUS FOR SEPARATING LAMINATED PACKS.

No. 558,457. Patented Apr. 14, 1896.

WITNESSES:
J. C. Shaw
J. Edw Luckett

INVENTOR
Frank McCarty,
BY
Fred G. Dieterich & Co.
ATTORNEYS

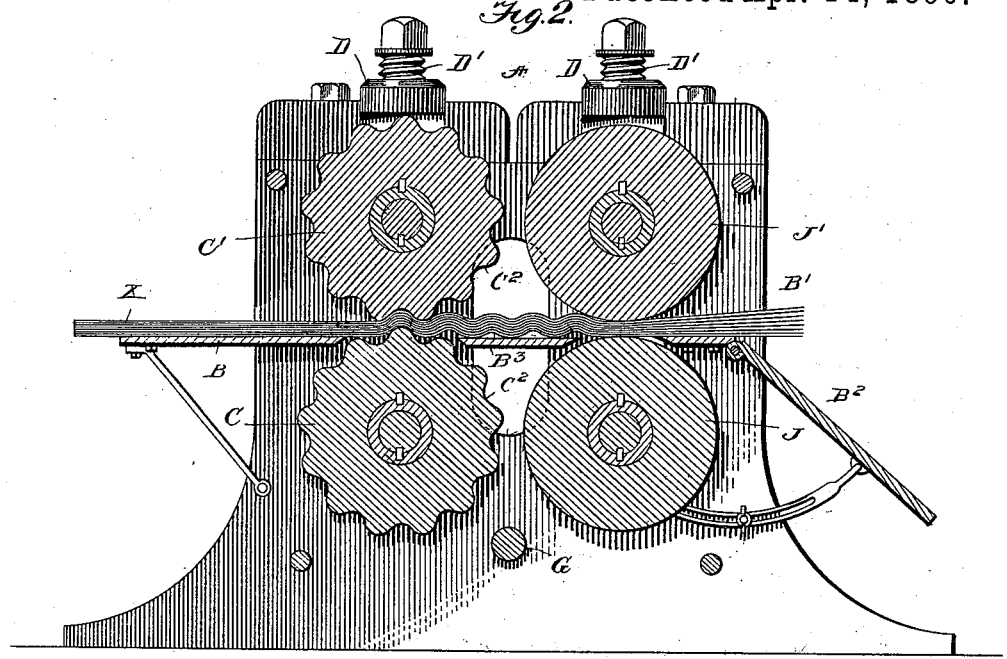
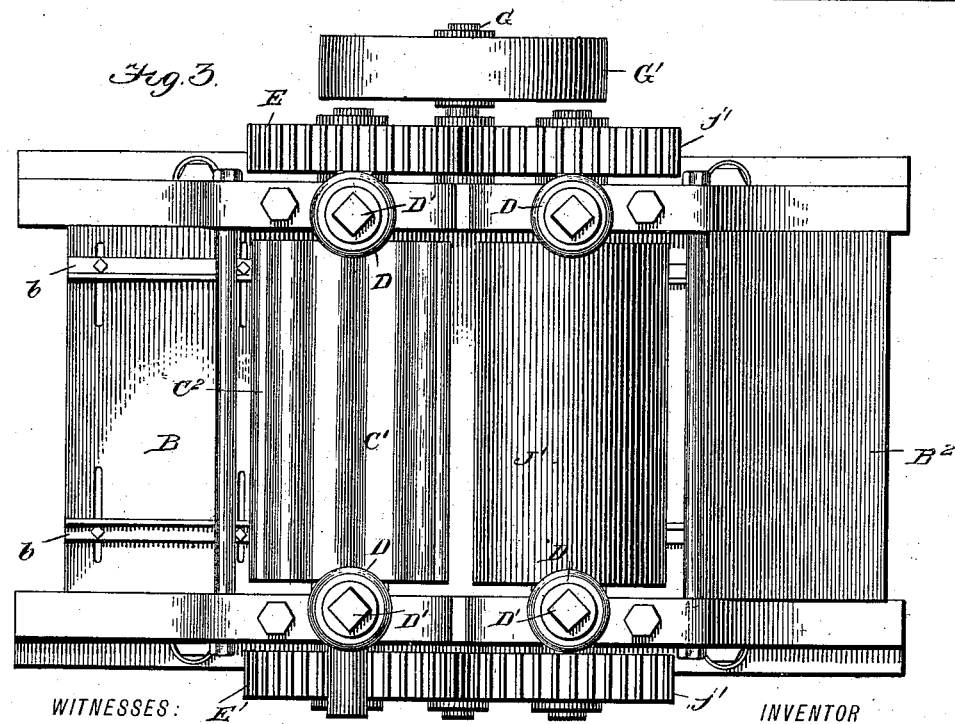

UNITED STATES PATENT OFFICE.

FRANK McCARTY, OF MARTIN'S FERRY, OHIO, ASSIGNOR OF ONE-THIRD TO THOMAS JOHNS AND CHARLES McCARTY, OF WHEELING, WEST VIRGINIA.

APPARATUS FOR SEPARATING LAMINATED PACKS.

SPECIFICATION forming part of Letters Patent No. 558,457, dated April 14, 1896.

Application filed November 21, 1895. Serial No. 569,705. (No model.)

*To all whom it may concern:*

Be it known that I, FRANK McCARTY, residing at Martin's Ferry, in the county of Belmont and State of Ohio, have invented a new and useful Apparatus for Separating Laminated Packs, of which the following is a specification.

In the manufacture of sheet-metal packs after the several sheets have been heated, rolled, reheated, bent upon themselves and sheared or cut up into the proper lengths and widths the several sheets are separated by hand, such separating operation being usually effected by first bending one edge of the laminated pack over to cause a partial separation of the sheets sufficient to enable the operator to pull the several sheets apart. This operation is very slow, expensive, and under certain conditions of the pack very unsatisfactory and wasteful, inasmuch as very often the several sheets forming the pack at certain points, owing either to a poor quality or grade of metal, or an incomplete or too much heating action when in the furnace, are so pressed or stuck together that it is impossible to pull them apart by hand, and in some instances when such defective sheets are separated they have their faces roughened or scaled or broken to such an extent as to render them of a very poor quality and frequently useless. In the manufacture of such tin or sheet-iron the said plates after being separated are also treated to a pickling process or bath to remove the scales.

The main object of my invention is to provide an apparatus whereby the said sheets can be quickly and positively separated in a uniform manner irrespective of the condition of irregular adhesiveness of the sheets, and with the bulk of the scales removed, so as to reduce the cost of separating and cleaning the sheets or plates to a minimum and make it possible to do mechanically and in a greatly reduced amount of time, practically without waste, what is now accomplished slowly, with great waste and cost, by hand.

My invention also has for its object to provide an apparatus of a simple and inexpensive but powerful construction to which the laminated pack is fed in the condition it leaves the last heating operation and after being cut to size, and from which the said pack will be discharged with the lamina completely separated and with the maximum amount of scale removed, so as to require but a very little pickling treatment.

With other minor objects in view, which will hereinafter fully appear, my invention consists in the apparatus hereinafter first described in detail, and then specifically pointed out in the appended claims, reference being had to the accompanying drawings, in which—

Figure 4:
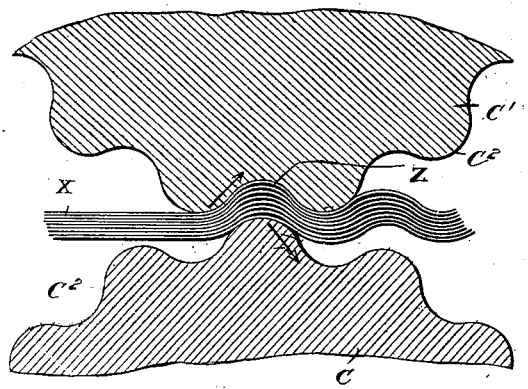
Figure 5:
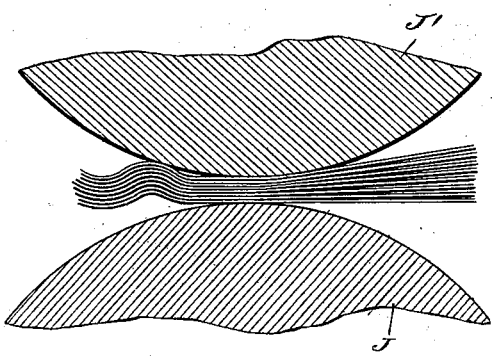
Figure 6:
Figure 7:

Figure 1 is a side elevation of my apparatus or machine for separating the sheets composing the laminated pack. Fig. 2 is a vertical longitudinal section thereof. Fig. 3 is a top plan view of the same. Figs. 4 and 5 are diagrammatic views hereinafter specifically referred to. Fig. 6 is a view of the pack before it is separated by my improved apparatus, and Fig. 7 shows the sheets which formed such pack separated.

The apparatus I employ to separate the said laminated packs involves practically two operations—first, the corrugations or bending the pack transversely and at the same time subjecting of the upper and lower faces to a drawing or pulling action in opposite directions—that is, drawing on the upper face in an upward direction and upon the lower face in a downward direction, so as to impart, as it were, a longitudinal pulling action in reverse directions, which will cause the several sheets to separate—the other operation being to subject the pack after it has been thus treated and corrugated to a sufficient pressure to bring the plates or sheets back to their normal or flat condition, but not stuck or adhering.

While the above operations may be accomplished in various mechanical ways, I prefer to employ an apparatus such as shown in the accompanying drawings, which I shall now proceed to describe in detail, it being understood that while my apparatus is more especially used for separating laminated packs of tin-plate the same construction, but of greater strength and size, can be used for separating heavy sheet-iron packs.

In the accompanying drawings, A indicates a main frame, having at one end a receiving table or platform B. At the inner end of this table is disposed a pair of rollers C C', one above the other, which have longitudinal corrugations C² C², which are held to intermesh, as clearly shown, the upper roller having a limited adjustment by means of the adjustable boxing D and adjusting-screw D'.

While I have found that the best results are attained by corrugating the rollers C C', in the manner shown, such rollers may be provided with irregular longitudinal protuberances or depressions and still serve to separate the pack-sheets in the manner hereinafter referred to. The lower roller C has at one end a cog-wheel E, which meshes with a drive-cog F on the drive-shaft G, provided at one end with a band-wheel G', as most clearly shown in Fig. 3.

At the discharge end of the machine is journaled a pair of smooth compression or straightening rolls J J', one above the other, which are of a diameter equal that of the major diameter of the rollers C C'—that is, the axes of the rollers C and J and C' and J' are in the same plane and the diameters of the said rollers C C' and J J' such that their meeting or engaging faces will be in a horizontal plane in line with the feed-table B, as is clearly shown in Fig. 2. The roller J' also has a limited adjustment the same as roller C' by means of a box D and screw D', and to cause the rollers J and J' to revolve at a uniform speed and at a speed equal that of the rollers C C', thereby to provide for a continuous and uniform feed for the pack, such rollers J J' have cog-wheels $j\ j'$, of a diameter the same as wheel E. The wheel $j$ also meshes with the drive-cog F, as shown.

B' indicates the discharge end of the table, which has an adjustable hinged member B², which can be set at any angle to lead the separated sheets to points desired, and B³ indicates a table or bed portion held intermediate the corrugating and straightening rolls.

So far as described the operation of my machine is best explained as follows:

Referring now more particularly to Figs. 2, 4, and 5, it will be seen that the rolls C and C' and J and J' are so adjusted as to just barely pass or admit the pack, which, as will be noticed at X, consists of eight sheets (such number being the usual one) held compressed or closely adhered to each other. At this point it should be stated that the object in providing a non-yielding bearing for the rolls C' and J' is to keep such rolls to a uniform position, especially so in regard to the upward play. This is found necessary for the reason that in many instances the packs vary in quality and in the degree of the adhesiveness of the several sheets comprising same. Thus in some instances the sheets will separate easy without any tearing action, while in others they at points stick so fast that a very strong pulling action is necessary to separate same. It will thus be readily seen that by having a fixed adjustment for the roll C', which in practice is just that of the thickness of the packs to be run through, that no matter how the pack-sheets may stick the action of the rolls C and C' will be the same as on a pack in which the sheets separate easily.

It will be readily seen that were the upper roll C' made yielding and the spring-bearing set for a normal resistance of the packs, as soon as a pack entered between same having an unusual resistance or non-separating set of sheets the upper roll C' would give and allow the pack to pass through without being sufficiently corrugated or crimped to separate the sheets.

By referring now to Fig. 4 it will be observed that as the pack enters and is fed between the rolls C C' it will be subjected to a similar pull or draw strain on both the upper and lower faces; but in view of the corrugations the said draw actions will not be on directly opposite sides, but at different points, the lower one slightly in advance of the other. This operation effects an irregular longitudinal draw action on the upper and lower faces of the pack, and in consequence at the points between the points where the two rolls C and C' grip the pack causes the sheets to separate and bulge up from each other, as indicaed at Z, it being manifest that as the pack passes to the front of the rolls C and C' the sheets will be entirely separated—that is, pulled apart from each other and to more or less extent held spaced apart. By reference to Fig. 2 it will be noticed that the pack after being crimped is fed direct to the smooth compression or straightening rolls J J', which are so arranged as to apply a pressure sufficient to press out the corrugations or crimps and leave the sheets in a perfectly flat and uniform condition. It will also be observed that while the said rolls press out the said crimps they also serve to add a creeping action to the sheets and thereby materially assist in causing them to separate, such action being produced as the rolls engage the corrugations, as the first impact of the rollers on the corrugations will tend to shove the upper part of the pack backward as the lower part is pulled forward after the pack has passed between the rollers C and C'. The laminæ are completely separated and by passing said corrugated laminæ through the compression-rollers all of said crimps or corrugations will be flattened out and the separation completed, inasmuch as it will be impossible for the sheet to adhere again, first, because said sheets are cool, and, secondly, there is not sufficient pressure.

It will also be noted that the corrugated portion is being flattened while the pack is being corrugated, the object of such operation being to make the compression-rollers exert a pull upon the leaves, and the corrugating-rolls also act to tightly hold the leaves and feed the same to the rolls, as it would be almost an impossibility to feed a separated corrugated pack to the compression-rollers.

As tin or sheet-iron packs are cut in different lengths and widths and as it is customary in opening and separating to make long runs of a certain size, I provide the feed-table B B with adjustable guides b b, which can be shifted laterally. Thus, should the packs be fed into the rolls C C' at one end during one part of the day, the said guides can be shifted to feed the packs the remaining part of the day at the other end of the said rolls and thereby equalize the wear on such rolls.

From the foregoing description, taken in connection with the accompanying drawings, it is thought the advantages and complete operation of my invention will be readily understood by those skilled in the art to which my invention appertains. It will be seen the capacity of my machine is only limited by the speed at which the packs can be fed to the machine and drawn therethrough. By my method of opening and separating the packs there will be practically no waste of material.

Having thus described my invention, what I claim, and desire to secure by Letters Patent, is—

1. In an apparatus for separating a laminated pack, a pair of crimping or corrugating rollers, and a pair of compression or straightening rollers operating in conjunction with the crimping-rollers whereby the laminæ are first bent transversely and then pulled or drawn longitudinally substantially as shown and described.

2. In an apparatus for separating a laminated pack, a pair of crimping or corrugating rollers, for bending the laminæ transversely and a pair of compression or straightening rollers arranged in close proximity to the corrugating-rollers whereby one end of a pack is subjected to a straightening and pulling operation while the other end is being bent transversely substantially as shown and described.

3. In an apparatus for separating laminated packs, the combination with the main frame, of the corrugated crimping-roller, the smooth straightening-rollers, the feed and delivery table between the bending and straightening rollers all arranged substantially as shown and described.

4. In an apparatus for separating laminated packs, the combination with the main frame, of the corrugating-rollers, the straightening-rollers, the feed-table, the intermediate table between the rollers and the adjustable delivery-table all arranged and operated substantially as shown and described.

5. In an apparatus for separating a laminated pack, the combination with a main frame, of a pair of corrugated crimping-rollers adjusted to pass or admit a laminated pack therebetween, and a pair of straightening-rollers adjusted similar to the crimping-rollers and arranged in close proximity thereto, and the feed-delivery and intermediate tables all arranged substantially as shown and described.

FRANK McCARTY.

Witnesses:
FRED. G. DIETERICH,
J. EDW LUCKETT.